US009229189B2

(12) United States Patent
Lee

(10) Patent No.: US 9,229,189 B2
(45) Date of Patent: Jan. 5, 2016

(54) LENS BARREL AND DIGITAL CAMERA HAVING THE SAME

(71) Applicant: SAMSUNG Electronics Co., Ltd., Suwon-si, Gyeonggi-do (KR)

(72) Inventor: Kyeong-eun Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 7 days.

(21) Appl. No.: 14/019,776

(22) Filed: Sep. 6, 2013

(65) Prior Publication Data

US 2014/0071335 A1 Mar. 13, 2014

(30) Foreign Application Priority Data

Sep. 12, 2012 (KR) .................. 10-2012-0101171

(51) Int. Cl.
*G02B 7/02* (2006.01)
*G03B 17/04* (2006.01)
*G03B 5/00* (2006.01)
*G03B 7/10* (2006.01)

(52) U.S. Cl.
CPC *G02B 7/021* (2013.01); *G03B 5/00* (2013.01); *G03B 7/10* (2013.01); *G03B 17/04* (2013.01)

(58) Field of Classification Search
CPC ....................................................... G03B 17/04
USPC ................. 348/360, 208.11, 222.1; 359/823; 352/142; 396/241
See application file for complete search history.

(56) References Cited

U.S. PATENT DOCUMENTS

| 6,978,089 | B2 | 12/2005 | Nomura et al. | |
| 7,295,772 | B2* | 11/2007 | Makii | 396/241 |
| 7,389,040 | B2 | 6/2008 | Nomura | |
| 7,606,478 | B2* | 10/2009 | Namazue | G02B 7/102 359/675 |
| 7,768,725 | B2* | 8/2010 | Yamano | G02B 7/102 359/823 |
| 2008/0043348 | A1* | 2/2008 | Imagawa et al. | 359/813 |
| 2010/0060995 | A1* | 3/2010 | Yumiki et al. | 359/704 |
| 2011/0158621 | A1* | 6/2011 | Honsho et al. | 396/55 |
| 2011/0274419 | A1* | 11/2011 | Imura et al. | 396/55 |

FOREIGN PATENT DOCUMENTS

| JP | 2000-292830 | 10/2000 | |
| JP | 2006-030297 | * 2/2006 | G02B 7/14 |
| JP | 2007-248642 | 9/2007 | |

* cited by examiner

*Primary Examiner* — Twyler Haskins
*Assistant Examiner* — Akshay Trehan
(74) *Attorney, Agent, or Firm* — Staas & Halsey LLP

(57) ABSTRACT

A lens barrel projects out of a main body of a camera during photographing and is accommodated in the main body of the camera during non-photographing and includes a plurality of lens assemblies including an escape lens assembly to be movable along a reference optical axis of the camera, and an escape unit to control the escape lens assembly to escape from the reference optical axis while the escape lens assembly moves from a photographing position to a non-photographing position, wherein lenses of the escape lens assembly have an optical axis that is in a skew position with respect to the reference optical axis in a position where the escape lens assembly has escaped.

18 Claims, 17 Drawing Sheets ately to the reference optical axis, and may control the escape lens assembly to slide by a predetermined distance along a direction of the rotating axis.

LENS BARREL AND DIGITAL CAMERA HAVING THE SAME

CROSS-REFERENCE TO RELATED APPLICATIONS

This application claims priority under 35 U.S.C. §119(a) from Korean Patent Application No. 10-2012-101171, filed on Sep. 12, 2012, in the Korean Intellectual Property Office, the disclosure of which is incorporated herein by reference in its entirety.

BACKGROUND OF THE INVENTION

1. Field of the Invention

The present disclosure relates generally to a lens barrel and a digital camera having the same, and more particularly to, a lens barrel that is disposed in a main body of a camera during non-photographing and a digital camera having the same.

2. Description of the Related Art

Recently, a digital camera having a digital sensor, such as a CCD sensor or a CMOS sensor, has become the main current of camera.

A camera is provided with a lens barrel having a plurality of lens groups installed therein, and the lens barrel moves the lenses in an optical-axis direction of the camera to perform a zooming operation and a focusing operation.

The lens barrel is kept to be extended forward during photographing and is compressed backward to be accommodated in a main body of the camera during non-photographing. In particular, it is general that a compact camera has a structure in which the lens barrel is accommodated in the main body of the camera during non-photographing.

In the above-described type camera where the lens barrel is accommodated in the main body of the camera during non-photographing, the size of the lens barrel during non-photographing exerts a great influence on the size of the main body of the camera. In particular, the thickness of the lens barrel during non-photographing has close relationships with the miniaturization design of the camera.

SUMMARY OF THE INVENTION

The present general inventive concept provides to a lens barrel having a reduced size during non-photographing and a digital camera having the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a lens barrel usable with a camera, the lens barrel including a plurality of lens assemblies including an escape lens assembly to be movable along a reference optical axis of the camera, and an escape unit to control the escape lens assembly to escape from the reference optical axis while the escape lens assembly moves from a photographing position to a non-photographing position, wherein one or more lenses of the escape lens assembly have an optical axis that is in a skew position with respect to the reference optical axis in a position where the escape lens assembly has escaped.

While the escape lens assembly moves from the photographing position to the non-photographing position, the escape unit may control the escape lens assembly to rotate at a predetermined angle about a rotating axis that is perpendicular to the reference optical axis, and may control the escape lens assembly to slide by a predetermined distance along a direction of the rotating axis.

The escape unit may include a rotating unit which rotates the escape lens assembly at the predetermined angle about the rotating axis that is perpendicular to the reference optical axis while the escape lens assembly moves from the photographing position to the non-photographing position, and a slide driving unit which makes the escape lens assembly slide for the predetermined distance along the direction of the rotating axis.

The escape lens assembly may include one or more escape lenses; and a lens mount member on which the escape lenses are mounted.

The lens barrel may further include a guide barrel coupled to the lens mount member to move forward or backward along the reference optical axis.

The rotating unit may include a pinion gear provided on the lens mount member, and a rack gear arranged in the rear of the escape lens assembly to be engaged with the pinion gear while the escape lens assembly moves from the photographing position to the non-photographing position.

The rack gear may be arranged along the reference optical axis.

The lens barrel may further include a shutter assembly that is arranged in the rear of the escape lens assembly, wherein the rack gear is provided on the shutter assembly.

The slide driving unit may include a pressing protrusion extended along a direction that is parallel to the rotating axis, and a pressed surface formed on the lens mount member to guide sliding of the lens mount member by being pressed by the pressing protrusion while the escape lens assembly moves from the photographing position to the non-photographing position.

The pressed surface may include a first contact surface and a second contact surface arranged vertically to the rotating axis and spaced apart from each other for the predetermined distance, and a middle surface to guide the pressing protrusion from any one of the first contact surface and the second contact surface, which is arranged closer to the reference optical axis, to the other contact surface arranged farther from the reference optical axis while the escape lens assembly moves from the photographing position to the non-photographing position.

The lens barrel may further include a return spring to apply to the lens mount member a torque in a direction opposite to a rotating force which the rotating unit applies to the lens mount member and a force in a direction opposite to a force which the slide driving unit applies to the lens mount member.

The lens barrel may further include a stop protrusion formed on the lens mount member; and a stopper disposed to come in contact with the stop protrusion at a time point where the escape lens assembly returns to the reference optical axis.

The lens mount member may include a lens mount portion on which the escape lens is mounted, a shaft coupling portion coupled to the guide barrel through a shaft member, and a connection portion to connect the lens mount portion to the shaft coupling portion.

The pinion gear may be formed on an outer periphery of the shaft coupling portion.

The guide barrel may include a barrel main body, and first and second mount portions to which both ends of the shaft member are coupled.

The return spring may be arranged to press a first end portion of the shaft coupling portion that is adjacent to the first mount portion, and the pressed surface may be formed on a second end portion of the shaft coupling portion that is adjacent to the second mount portion.

A first end portion of the return spring may be fixed to the first mount portion, and a second end portion of the return spring may be fixed to the shaft coupling portion.

The pressing protrusion may project from an inner side surface of the second mount portion.

The stop protrusion may be formed at the second end portion of the shaft coupling portion, and the stopper may be formed on the inner side surface of the second mount portion.

The foregoing and/or other features and utilities of the present general inventive concept may be achieved by providing a digital camera including a lens barrel as described above or hereinafter.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
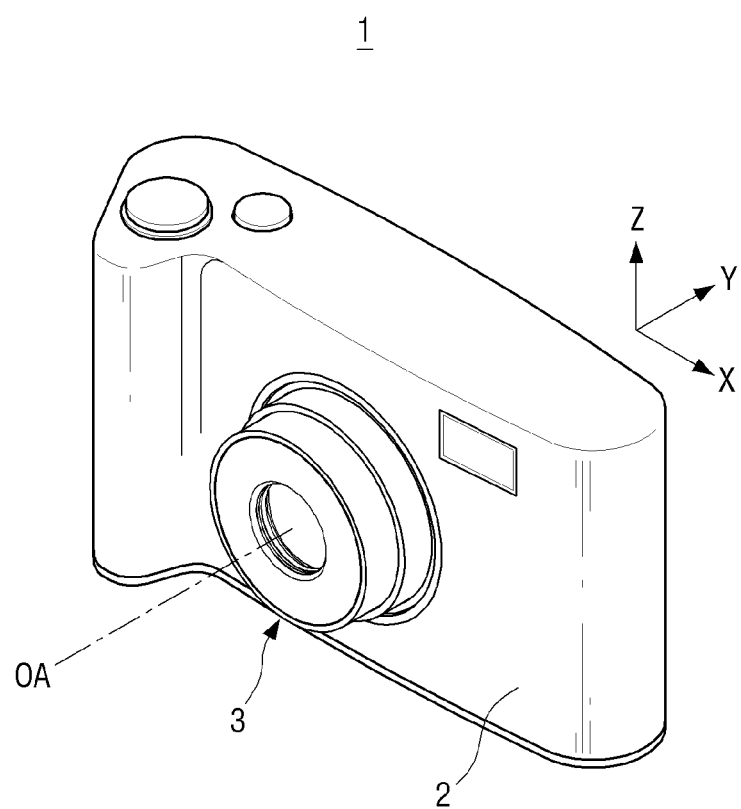
FIG. 1 is a perspective view illustrating a shape of a camera during photographing according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
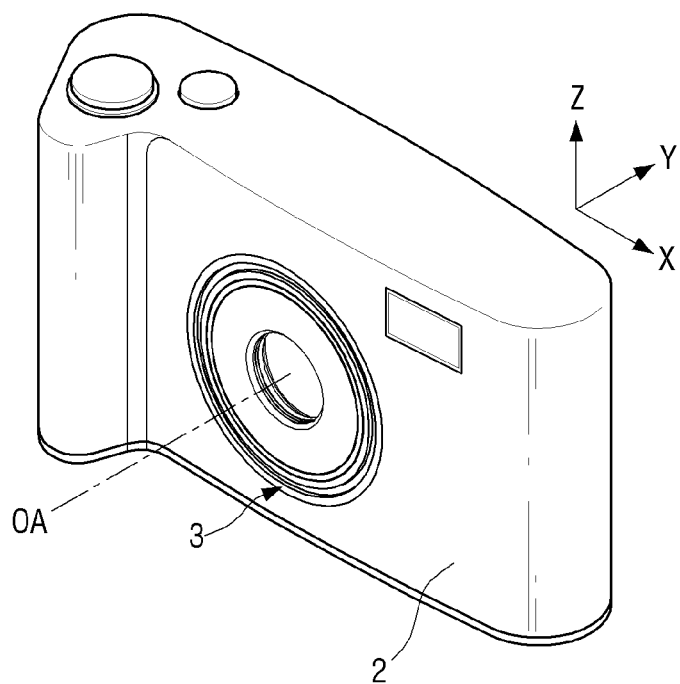
FIG. 2 is a perspective view illustrating a shape of the camera illustrated in FIG. 1 during non-photographing.
Figure 3:
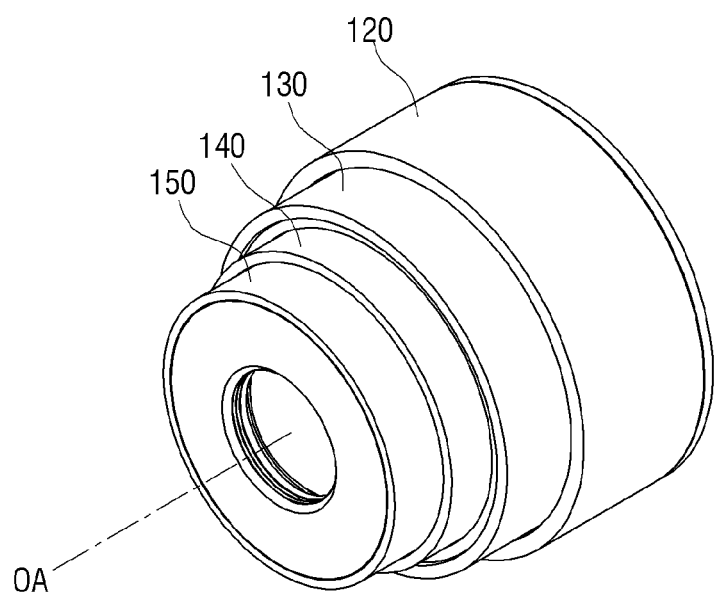
FIG. 3 is a perspective view illustrating a lens barrel provided in the camera illustrated in FIG. 1.

FIG. 1 is a perspective view illustrating a shape of a camera 1 during photographing according to an embodiment of the present general inventive concept, FIG. 2 is a perspective view illustrating a shape of the camera 1 illustrated in FIG. 1 during non-photographing, and FIG. 3 is a perspective view illustrating a lens barrel provided in the camera 1 illustrated in FIG. 1.

Referring to FIGS. 1 to 3, the camera 1 includes a camera main body 2 and a lens barrel 3.

As illustrated in FIG. 1, during photographing, the lens barrel 3 is extended forward along an optical axis OA of the camera 1, and at least a portion of the lens barrel 3 may project out of (protrude from) the camera main body 2. As illustrated in FIG. 2, during non-photographing, at least a portion of the lens barrel 3 is compressed (retracted) backward along the optical axis OA of the camera 1 to be disposed or received in the camera main body 2. Since the lens barrel 3 is accommodated in the camera main body 2 during the non-photographing, an external appearance or size of the camera 1 can be kept compact.

In order to distinguish from an optical axis of a specific lens assembly in the lens barrel 3, the optical axis OA of the camera 1 is referred to as a "reference optical axis (OA)."

Figure 4:
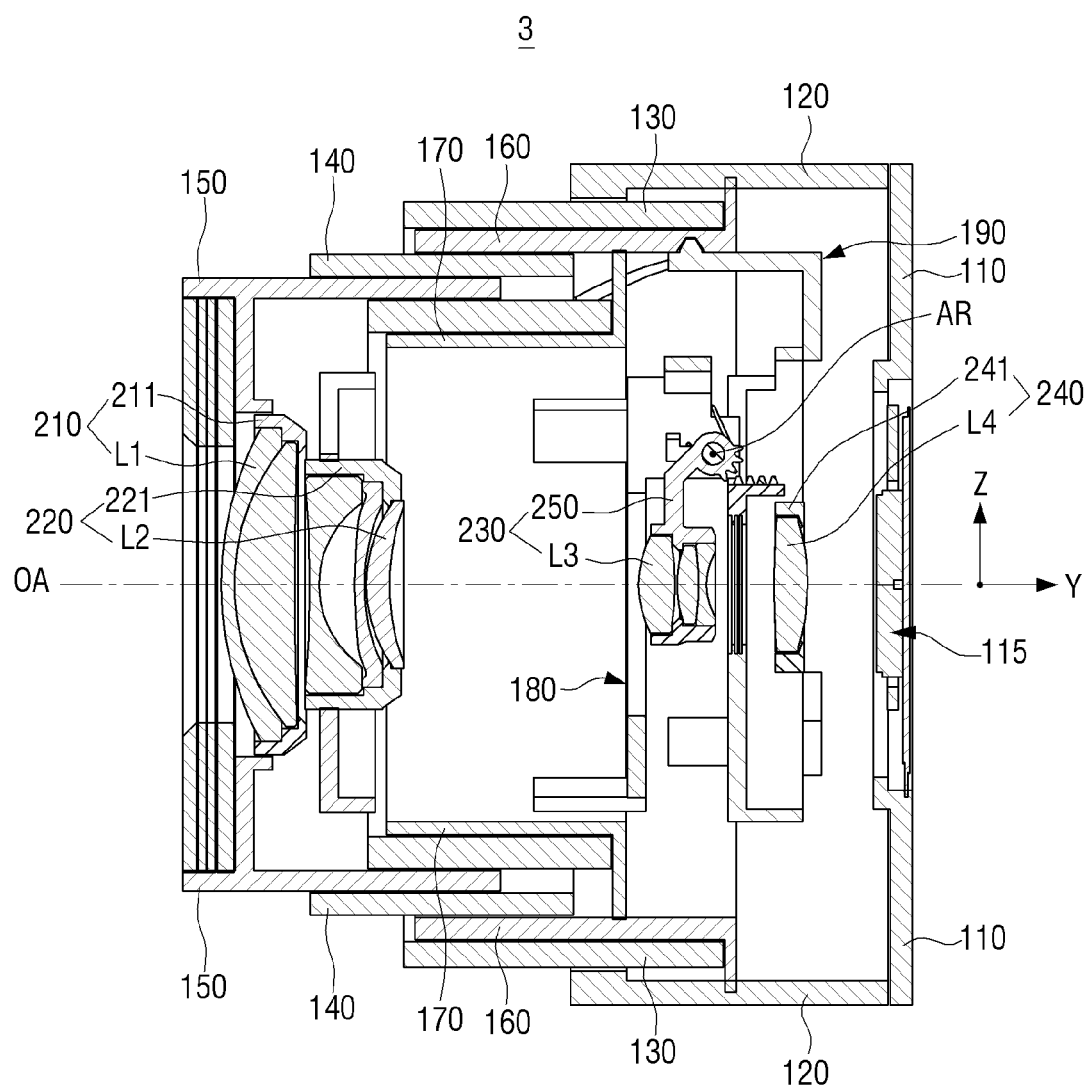
FIG. 4 is a cross-sectional view illustrating a state of the lens barrel of FIG. 3 during photographing.
Figure 5:
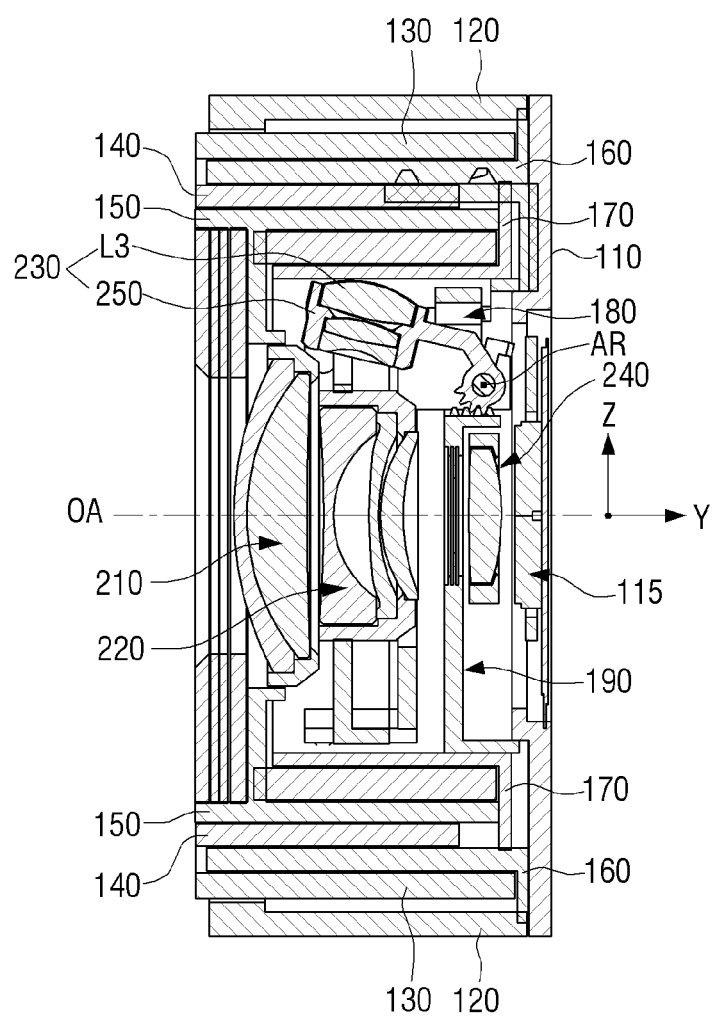
FIG. 5 is a cross-section view illustrating a state of the lens barrel of FIG. 3 during non-photographing.
Figure 6:
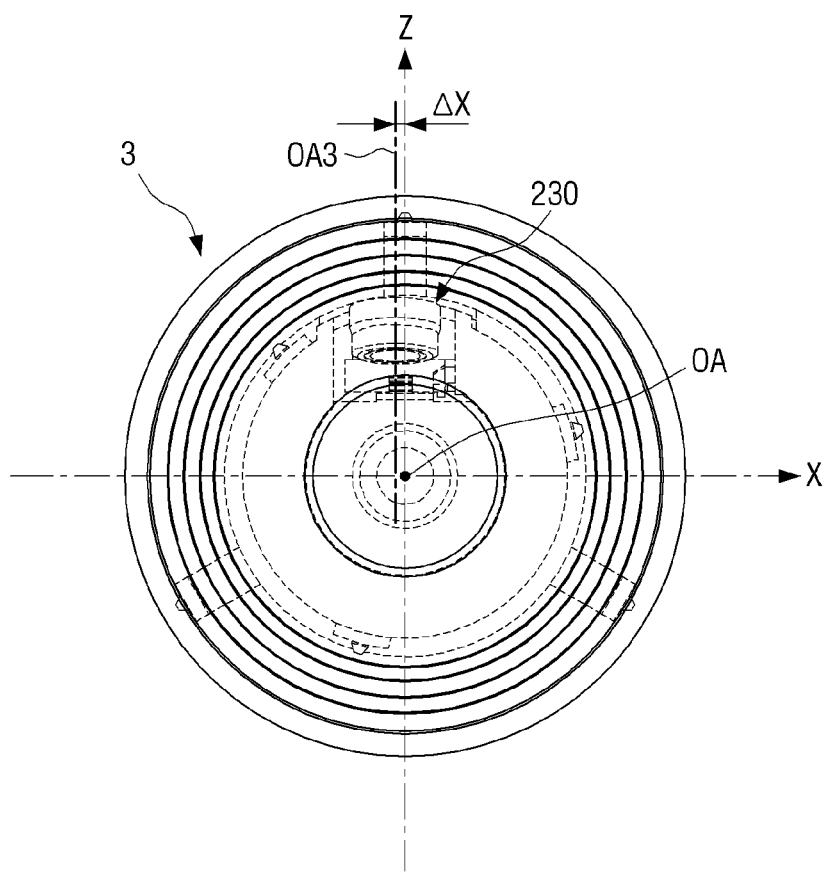
FIG. 6 is a front view illustrating a state of the lens barrel of FIG. 3 during non-photographing.
Figure 7:
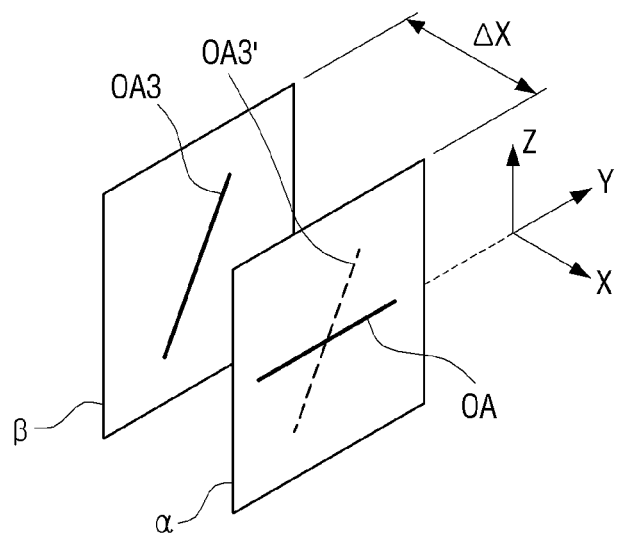
FIG. 7 is a view illustrating an optical axis of a third lens assembly (escape lens assembly) provided in the lens barrel of FIG. 3 during non-photographing.

FIG. 4 is a cross-sectional view illustrating a state of the lens barrel 3 of FIG. 3 during photographing, and FIG. 5 is a cross-section view illustrating a state of the lens barrel 3 of FIG. 3 during non-photographing. FIG. 6 is a front view illustrating a state of the lens barrel 3 of FIG. 3 during non-photographing, and FIG. 7 is a view illustrating an optical axis OS of a third lens assembly 230 provided in the lens barrel 3 of FIG. 3 during non-photographing.

Referring to FIGS. 4 and 5, the lens barrel 3 includes a base frame 110 and a plurality of outer barrels 120, 130, 140, and 150. The configurations of the base frame and outer barrels 110, 120, 130, 140, and 150 may form an external appearance of the lens barrel 3 of FIG. 3 as described above.

The base frame 110 is arranged on a plane that is perpendicular to the reference optical axis OA. In a center portion of the base frame 110, a digital image sensor 115 is provided. In this embodiment, the image sensor 115 may be a CMOS sensor, and as an alternative, may be a CCD sensor.

The plurality of outer barrels 120, 130, 140, and 150 include the first outer barrel 120, the second outer barrel 130, the third outer barrel 140, and the fourth outer barrel 150. The first outer barrel 120 is fixedly coupled to the base frame 110. The second to fourth outer barrels 130, 140, and 150 are disposed to be movable forward and backward along the reference optical axis OA and to be rotatable about the optical axis OS. Referring to FIG. 4, the fourth outer barrel 150, the third outer barrel 140, the second outer barrel 130, and the first outer barrel 120 are arranged in order to be closer to an object or to be away from the camera sensor 115 during photographing.

The lens barrel 3 includes a first inner barrel 160, a second inner barrel 170, and a third inner barrel 180 provided therein. In interlocking with the movement of the second to fourth outer barrels 130, 140, and 150, the inner barrels 160, 170, and 180 also move forward and backward along the reference optical axis OA as rotating about the reference optical axis OA. The interlocking between the outer barrels 130, 140, and 150 and the inner barrels 160, 170, and 180 is performed by a cam structure. Since the interlocking between the barrels through the cam structure is well known, more detailed description thereof will be omitted.

The lens barrel 3 also includes a plurality of lens assemblies 210, 220, 230, and 240 and a shutter assembly 190. Here, the plurality of lens assemblies 210, 220, 230, and 240 include the first lens assembly 210, the second lens assembly 220, the third lens assembly 230, and the fourth lens assembly 240.

The first lens assembly 210 includes a first group lens L1 and a lens mount member 211. The first group lens L1 is mounted on the lens mount member 211 so as to be aligned along the reference optical axis OA. The lens mount member 211 is coupled to the fourth outer barrel 150, and thus the first group lens L1 is guided to move along the reference optical axis OA by the fourth outer barrel 150. In this embodiment, the first group lens L1 may include a number of sheets of photographing lenses, for example, two sheets of photographing lenses. However, the present general inventive concept is not limited thereto. It is possible that the number of lenses may be changed.

The second lens assembly 220 includes a second group lens L2 and a lens mount member 221. The second group lens L2 is mounted on the lens mount member 221 to be aligned along the reference optical axis OA. The lens mount member 221 of the second lens assembly 220 is coupled to the lens mount member 211 of the first lens assembly 210 as described above. Accordingly, the second group lens L2 moves along the reference optical axis OA in the same manner as the first group lens L1. In this embodiment, the second group lens L2 may include a number of sheets of photographing lenses, for example, three sheets of photographing lenses. However, the present general inventive concept is not limited thereto. It is possible that the number of lenses may be changed. As illustrated in FIG. 4, an outer diameter of the second group lens L2 is smaller than an outer diameter of the first group lens L1.

The third lens assembly 230 includes a third group lens L3 and a lens mount member 250 to mount the third group lens thereon. As illustrated in FIG. 4, during photographing, the optical axis OS of the third group lens L3 is aligned along the reference optical axis OA. As illustrated in FIG. 5, during non-photographing, the third group lens L3 moves to escape from the reference optical axis OA. The details of the escape of the third group lens L3 will be described later. The lens mount member 250 is mounted on the third inner barrel 180 as described above, and is guided to move along the reference optical axis OA by the third inner barrel 180. In this embodiment, the third group lens L3 is composed of three sheets of photographing lenses, but in an alternative embodiment, the number of lenses may be changed. As illustrated in FIG. 4, the outer diameter of the third group lens L3 is smaller than the outer diameter of the second group lens L2.

The fourth lens assembly 240 includes a fourth group lens L4 and a lens mount member 241 to mount the fourth group lens L4 thereon. In this embodiment, the fourth group lens L4 includes one sheet of auto focusing lens (AF lens). The fourth lens assembly 240 performs auto focusing as moving along the reference optical axis OA by a separate actuator (for example, voice coil motor) that is different from actuators that drive the first to third lens assemblies 210, 220, and 230.

The shutter assembly 190 is arranged between the third lens assembly 230 and the fourth lens assembly 240, and is provided with one or more sheets of shutter film therein. By opening or closing a shutter hole 192 (see FIG. 11) through such shutter films, the amount of light exposure of the image sensor 115 is adjusted. The shutter assembly 190 is also movable along the reference optical axis OA, and such movement of the shutter assembly 190 is guided by the first inner barrel 160.

Referring to FIGS. 5 and 6, a mode of the lens barrel 3 is changed from a photographing mode to a non-photographing mode, the third lens assembly 230 as described above rotates at a predetermined angle about a rotating axis AR that is perpendicular to the reference optical axis OA, and slides for a predetermined distance an ΔX in an −X direction along the rotating axis AR. In this embodiment, a rotating angle of the third lens assembly 230 between positions of the photographing mode and the non-photographing mode is about 100 degrees. However, the present general inventive concept is not limited thereto. It is possible that the rotating angle can be smaller or larger than 100 degrees according to a design or user preference.

While the mode of the lens barrel 3 is changed from the photographing mode to the non-photographing mode, the rotating and the sliding of the third lens assembly 230 may simultaneously occur, and thus the escape of the third lens assembly 230 with respect to the reference optical axis OA is achieved during the non-photographing. It is possible that starting times and ending times of the rotating and sliding of the third lens assembly 230 may be same. It is possible that the starting time of the rotating of the third lens assembly 230 may be different from the starting time of the sliding of the third lens assembly 230 or that the ending time of the rotating of the third lens assembly 230 may be different from the ending time of the sliding of the third lens assembly 230. It is also possible that the starting time and the ending time of the rotating of the third lens assembly 230 may be different from the starting time and the ending time of the sliding of the third lens assembly 230, respectively. The rotating and sliding of the third lens assembly 230 may be performed during a period between the photographing mode and the non-photographing mode. Since the third lens assembly 230 is a lens assembly that escapes from the reference optical axis OA during the non-photographing, hereinafter, for convenience in explanation, the third lens assembly 230 is referred to as an escape lens assembly 230.

Referring to FIG. 7, α denotes a Y-Z plane, and β denotes another plane which is parallel to the plane α and is spaced apart from the plane α by a distance ΔX in an −X direction. As illustrated in FIG. 7, the reference optical axis OA is arranged on the plane α along the Y direction, and during the non-photographing, an optical axis OA3 of the third group lens L3 is arranged on the plane β. At this time, since the plane α and the plane β are in parallel to each other, the reference optical axis OA and the optical axis OA3 of the third group lens L3 do not cross each other during the non-photographing. Further, as illustrated in FIG. 7, during the non-photographing, the reference optical axis OA and the optical axis OA3 of the third group lens L3 are not in parallel to each other. As described above, during the non-photographing, the optical axis OA3 of the third group lens L3 and the reference optical axis OA are not in parallel to each other and do not cross each other. In simple words, during the non-photographing, the optical axis OA3 of the third group lens L3 is arranged in a so-called "skew position" with respect to the reference optical axis OA.

If the third lens assembly (escape lens assembly) 230 rotates only without sliding while the mode of the lens barrel 3 is changed from the photographing mode to the non-photographing mode, it can be understood that the third group lens L3 has an optical axis OA3' that exists on the plane □ during the non-photographing. Since such an optical axis OA3' crosses the reference optical axis OA, it is not in the skew position with respect to the reference optical axis OA.

As the escape of the third lens assembly (escape lens assembly) 230 with respect to the reference optical axis OA is performed while the mode of the lens barrel 3 is changed from the photographing mode to the non-photographing mode, as illustrated in FIG. 5, a space where the escape lens assembly 230 was located during the photographing may be used as an accommodation space of other lens assemblies during the non-photographing. Accordingly, a thickness of the lens barrel 3 during the non-photographing can be reduced, compared to a thickness thereof in a case where the escape of the escape lens assembly 230 is not performed.

The thickness reduction effect of the lens barrel 3 can be increased as the escape operation of the escape lens assembly 230 includes not only the rotation about the rotating axis AR but also the sliding in the direction of the rotating axis AR. The thickness reduction effect as described above will be described in more detail with reference to FIGS. 8 to 10.

Figure 8:
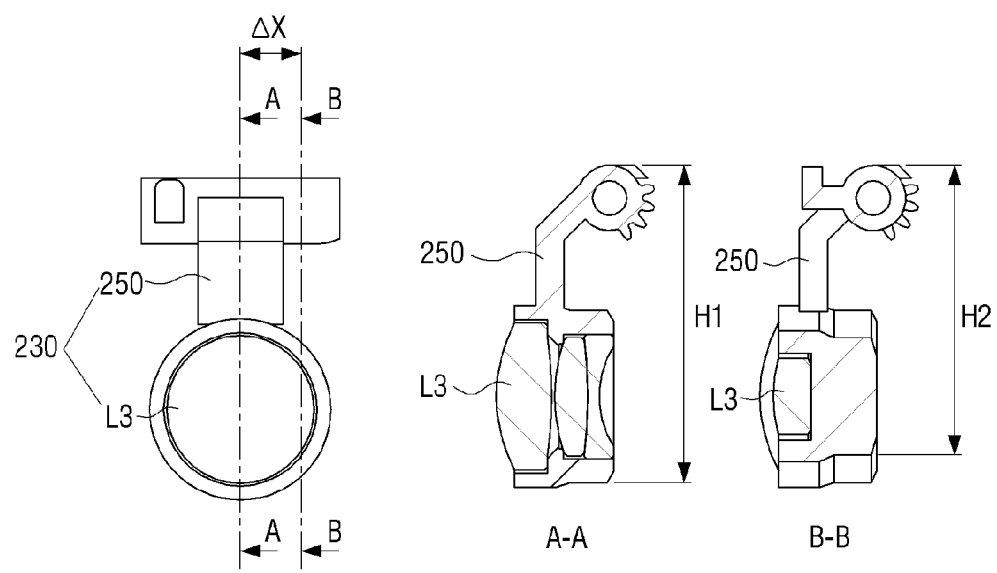
FIG. 8 is a view illustrating a length of a third lens assembly along a center line of a third lens assembly and a length of the third lens in a position that is spaced apart by a distance from the center line.
Figure 9:
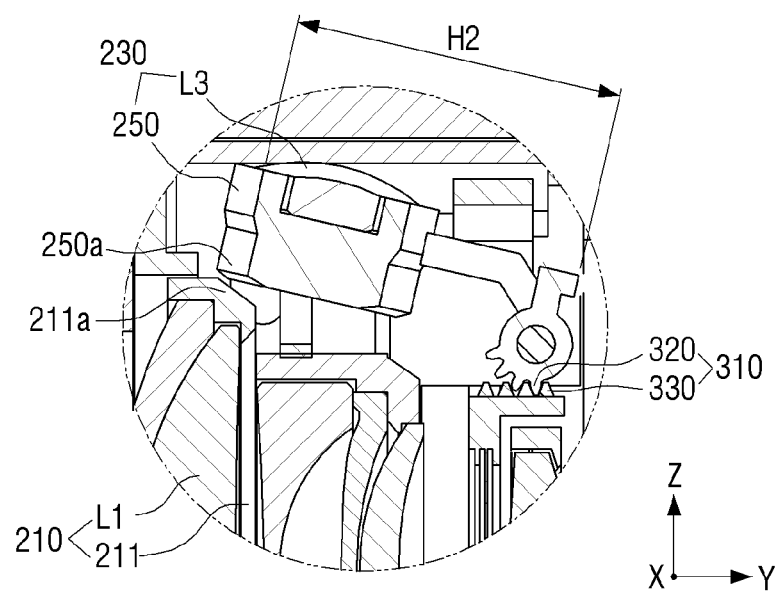
FIG. 9 is a cross-sectional view illustrating s structure in the vicinity of an escape lens assembly when escape of the escape lens assembly is performed with a rotating operation and a sliding operation.

FIG. 8 is a view illustrating a length H1 of the escape lens assembly 230 along a center line of the third lens assembly 230 and a length of the escaper lens assembly 230 in a position that is spaced apart for the distance ΔX from the center line. FIG. 9 is a cross-sectional view a structure in the vicinity of the escape lens assembly 230 in the case where escape of the escape lens assembly 230 is performed with a rotating operation and a sliding operation, and FIG. 10 is a cross-sectional view a structure in the vicinity of the escape lens assembly 230 in the case where escape of the escape lens assembly 230 is performed only with a rotating operation.

Figure 10:
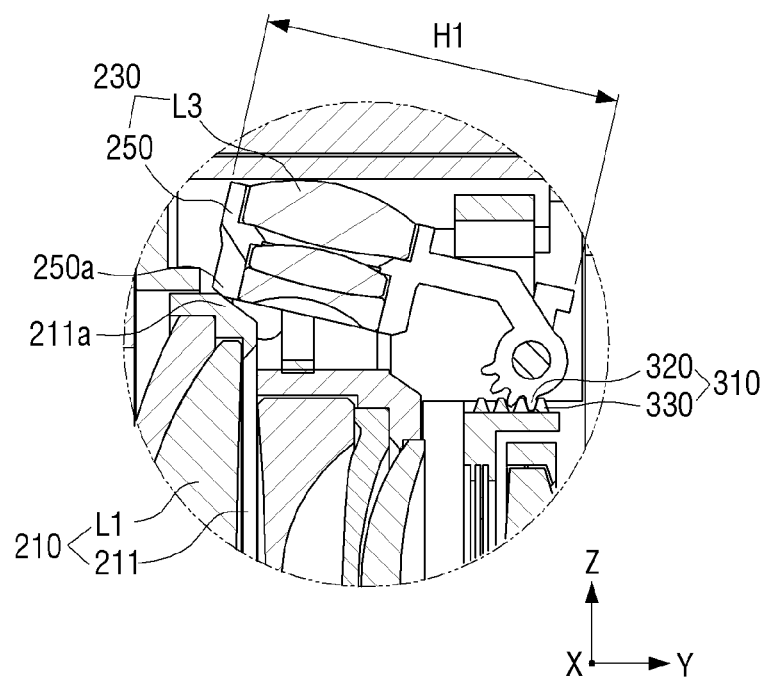
FIG. 10 is a cross-sectional view illustrating a structure in the vicinity of an escape lens assembly when escape of the escape lens assembly is performed only with a rotating operation.

Referring to FIGS. 7 and 10, the length of the cross section taken along a line A-A (center line) of the escape lens assembly 230 is H1, and the length of the cross section taken along a line B-B (B-B cross section) that is spaced apart for the distance ΔX from the center line of the escape lens assembly 230 is H2. As can be known from the drawing, H2 is shorter than H1.

As illustrated in FIG. 9, in the case where the escape of the escape lens assembly 230 includes the rotating operation and the sliding operation as in this embodiment, in the non-photographing position, a free end portion 250a (distal end portion) of the lens mount member 250 of the escape lens assembly 230 does not come in contact with the upper end portion 211a of the lens mount member 211 of the first lens assembly 210. In other words, even if the first lens assembly 210 moves inwardly (in the Y direction) to the extent as illustrated in FIG. 9, the escape lens assembly 230 still does not interfere with the first lens assembly 210.

However, unlike this embodiment, if the escape of the escape lens assembly 230 includes only the rotating operation, as illustrated in FIG. 10, the free end portion 250a of the escape lens assembly 230 in the non-photographing position comes in contact with the upper end portion 211a of the first lens assembly 210. In other words, if the first lens assembly 210 moves inwardly (in the Y direction) to the extent as illustrated in FIG. 10 (which is equal to the extent as illustrated in FIG. 9), the escape lens assembly 230 interferes with the first lens assembly 210. This is because if the escape of the escape lens assembly 230 includes only the rotating operation, the length of the B-B cross section arranged on the Y-Z plane becomes larger to the extent of a distance ΔH (=H1−H2). In order to prevent such interference, the backward distance of the first lens assembly 210 should be reduced during the non-photographing, and in this case, the thickness reduction effect of the lens barrel 3 during the non-photographing may be reduced in comparison to the case according to this embodiment.

In order to perform the escape operation of the escape lens assembly 230 when the mode is changed from the photographing mode to the non-photographing mode, the lens barrel 3 includes an escape unit. The escape unit includes a rotating unit 310 (in FIG. 9) to control the escape lens assembly 230 to rotate about the rotating axis AR that is perpendicular to the reference optical axis OA when the escape lens assembly 230 moves from the photographing position to the non-photographing position, and a slide driving unit 350 to control the escape lens assembly 230 to slide along the rotating axis AR when the escape lens assembly 230 is rotated by the rotating unit 310.

As illustrated in FIG. 9, the rotating unit 310 includes a pinion gear 320 provided on the lens mount member 250 of the escape lens assembly 230, and a rack gear 330 provided on the shutter assembly 190.

The slide driving unit 350 may include a pressing protrusion 360 provided on the third inner barrel 180, and a pressed surface 370 provided on the lens mount member 250 of the escape lens assembly 230 which will be describe later with reference to FIGS. 13 and 14.

A structure (components) of the lens barrel 3 which are directly and indirectly related to operations of the driving unit 350 and the slide driving unit 350 will be described with reference to FIGS. 11 to 14.

Figure 11:
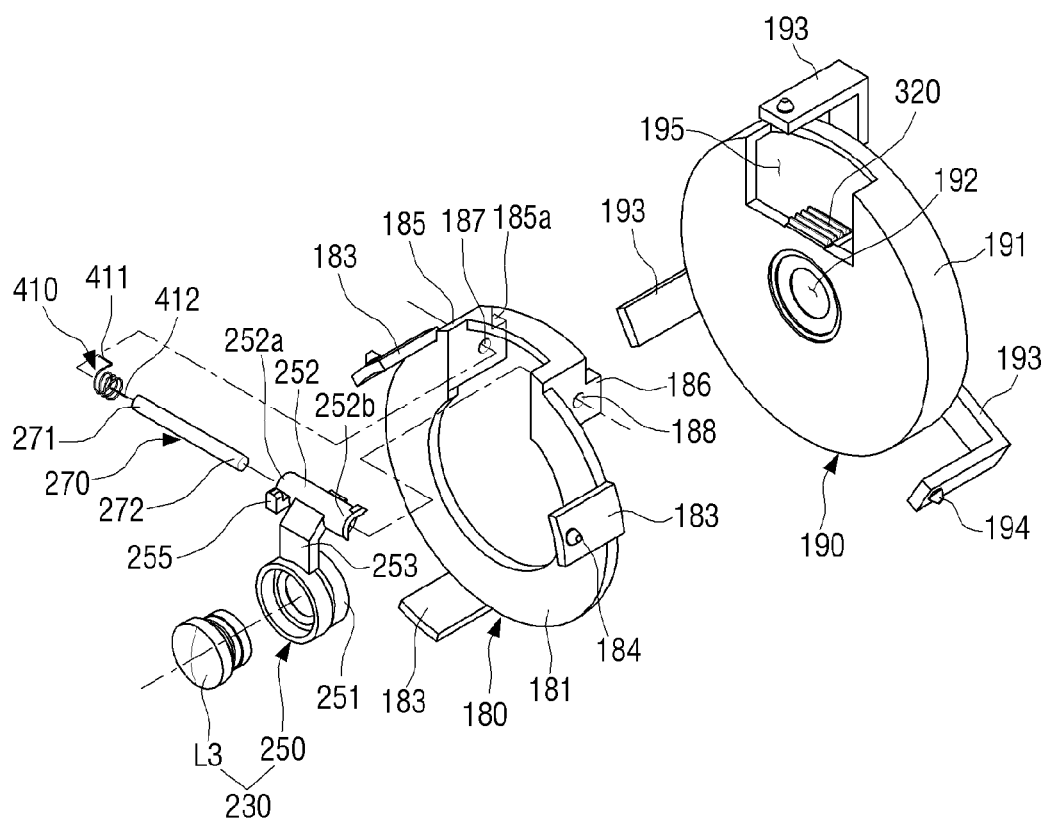
FIG. 11 is a perspective view illustrating components directly related to an escape operation of an escape lens assembly according to an embodiment of the present general inventive concept.
Figure 12:
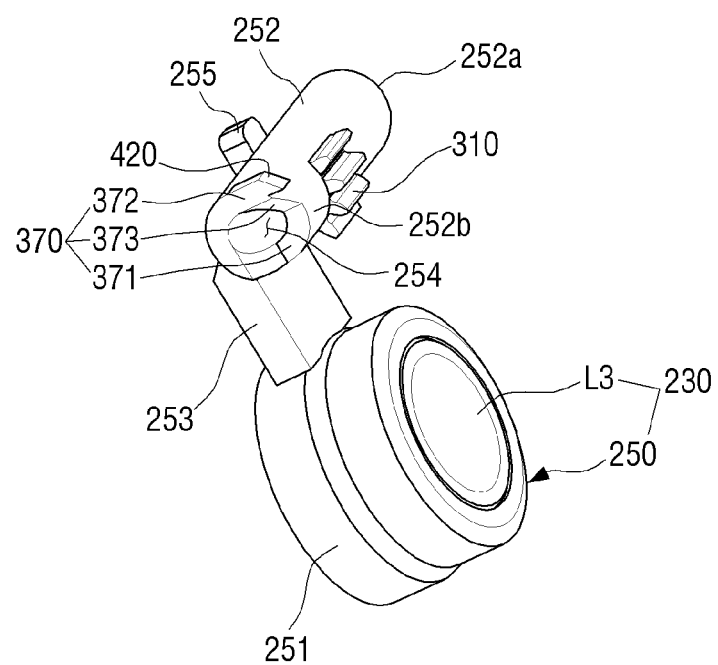
FIG. 12 is a rear perspective view illustrating the escape lens assembly illustrated in FIG. 11.

FIG. 11 is a perspective illustrating components directly related to an escape operation of the escape lens assembly 230, and FIG. 12 is a rear perspective view illustrating the escape lens assembly 230 illustrated in FIG. 11. FIG. 13 is a front view illustrating a coupling state of the escape lens assembly 230 and the third inner barrel, and FIG. 14 is a perspective view illustrating a rear portion of the coupling state of FIG. 13.

First, the escape lens assembly 230 will be described.

As described above, the escape lens assembly 230 includes the third group lens (escape lens) L3 and the lend mount member 250 to mount the third group lens L3 thereon. Here, the lens mount member 250 includes a lens mount portion 251 on which the third group lens (escape lens) L3 is mounted, a shaft coupling portion 252 coupled to the third inner barrel 180 through a shaft member 270, and a connection portion 253 to connect the lens mount portion 251 to the shaft coupling portion 252.

As illustrated in FIG. 12, the shaft coupling portion 252 is substantially in a cylindrical shape, and is pierced by a shaft through-hole 254 in the length direction thereof. In a center portion of a circumference of the shaft coupling portion 252, a pinion gear 320 that constitutes the rotating unit 310 is formed.

In a first end portion 252a of the shaft coupling portion 252, a spring fixing protrusion 255, to which a second end portion 412 of a return spring 410 to be described later is fixed, is formed.

In a second end portion 252b of the shaft coupling portion 252, a pressed surface 370 to guide the sliding of the lens mount member 250 as described above is formed. The pressed surface 370 includes a first contact surface 371, a second contact surface 372, and a middle surface 373. The first and second contact surfaces 371 and 372 are arranged vertically to the rotating axis AR of the escape lens assembly 230, and are spaced apart from each other for □X along the rotating axis AR. The second contact surface 372 is arranged from the first contact surface 371 to an outside thereof to correspond to a distance ΔX along the rotating axis AR. That is, the second contact surface 372 is disposed be farther apart from the reference optical axis OA to correspond to the distance ΔX than the first contact surface 371.

Further, in the second end portion 252b of the shaft coupling portion 252, a stop protrusion 420 is formed to project backward. the stop protrusion 420 interacts with a stopper 430 formed in the third inner barrel 180 to be described later, and stops the rotation of the escape lens assembly 230 in a position where the escape lens (third group lens) L3 is aligned along the reference optical axis OA when the escape lens assembly 230 returns from the non-photographing position to the photographing position.

Next, the third inner barrel 180 will be described.

Referring to FIG. 11, the third inner barrel 180 guides the escape lens assembly 230 so that the escape lens assembly 230 can move along the direction of the reference optical axis OA. Accordingly, hereinafter, for convenience in explanation, the third inner barrel 180 is called a "guide barrel 180".

The guide barrel 180 includes a barrel main body 181 having an accommodation hole 182 formed in a center portion thereof, three pin arms 183 arranged at equal intervals on the circumference of the barrel main body 181, and first and second mount portions 185 and 186 extended from an upper end of the barrel main body 181 to a backward direction.

On each of the pin arms 183, a cam pin 184 is provided which slides along a cam groove (not illustrated) formed on an inner periphery of the second inner barrel 170 (see FIG. 4). As the cam pin 184 slides along the cam groove of the second inner barrel 170, the guide barrel 180 goes forward or backward along the reference optical axis OA.

The first and second mount portions 185 and 186 are spaced apart from each other for a distance that is slightly shorter than the length of the shaft member 270. First and second shaft holes 187 and 188 are formed on the first and second mount portions 185 and 186, respectively, and first and second end portions 271 and 272 of the shaft member 270 are coupled to (rotatably disposed in) the first and second shaft holes 187 and 188, respectively. On an upper portion of the rear end of the first mount portion 185, a spring fixing groove 185a, to which a first end portion 411 of the return spring 410 is fixed, is formed.

Next, the shutter assembly 190 will be described.

The shutter assembly 190 is arranged between the third lens assembly 230 and the fourth lens assembly 240, and one or more sheets of shutter films are provided inside the shutter assembly 190. As the shutter hole 192 is opened or closed by the shutter films, the amount of light exposure of the image sensor 115 is adjusted. The shutter assembly 190 is also movable along the reference optical axis OA, and such a movement of the shutter assembly 190 is guided by the first inner barrel 160 (see FIG. 4).

The shutter assembly 190 includes a shutter main body 191 having the shutter hole 192 formed in the center thereof, and three pin arms 193 arranged at equal intervals on a circumference of the shutter main body 191.

One or more sheets of shutter films are provided in the shutter main body 191, and the shutter hole 192 is opened or closed by the shutter films to adjust an amount of light exposure. Cam pins 194 are provided on the respective pin arms 193. The cam pins 194 slide along cam grooves (not illustrated) formed on an inner periphery of the first inner barrel 160 (see FIG. 3), and thus the shutter assembly 190 moves forward or backward along the reference optical axis OA.

On an upper side of the shutter hole 192 on the shutter main body 191, a gear hole 195 with front and upper portions opened is formed, and on a lower end portion of the gear hole 195, a rack gear 330 that constitutes the rotating unit 310 together with the pinion gears 320 as described above is formed. Gears of the rack gear 330 are arranged to be parallel to the reference optical axis OA.

Next, the shaft member 270 will be described.

The shaft member 270 has a long cylindrical shape. The shaft member 270 is arranged to pass through the return spring 410 and the shaft through-hole 254 of the escape lens assembly 230. Further, the first and second end portions 271 and 272 of the shaft member 270 are inserted into the first and second shaft coupling holes 187 and 188 of the guide barrel 180 to control the guide barrel 180 and the escape lens assembly 230 to be coupled to each other.

Next, the return spring 410 will be described.

The return spring 410 is arranged to surround the shaft member 270 between the first end portion 252a of the shaft coupling portion 252 of the escape lens assembly 230 and the first mount portion 185 of the guide barrel 180. The first end portion 411 of the return spring 410 is fixed to the spring fixing groove 185a of the guide barrel 180, and the second end portion 412 of the return spring 410 is fixedly coupled to the spring fixing protrusion 255 of the escape lens assembly 230.

Figure 13:
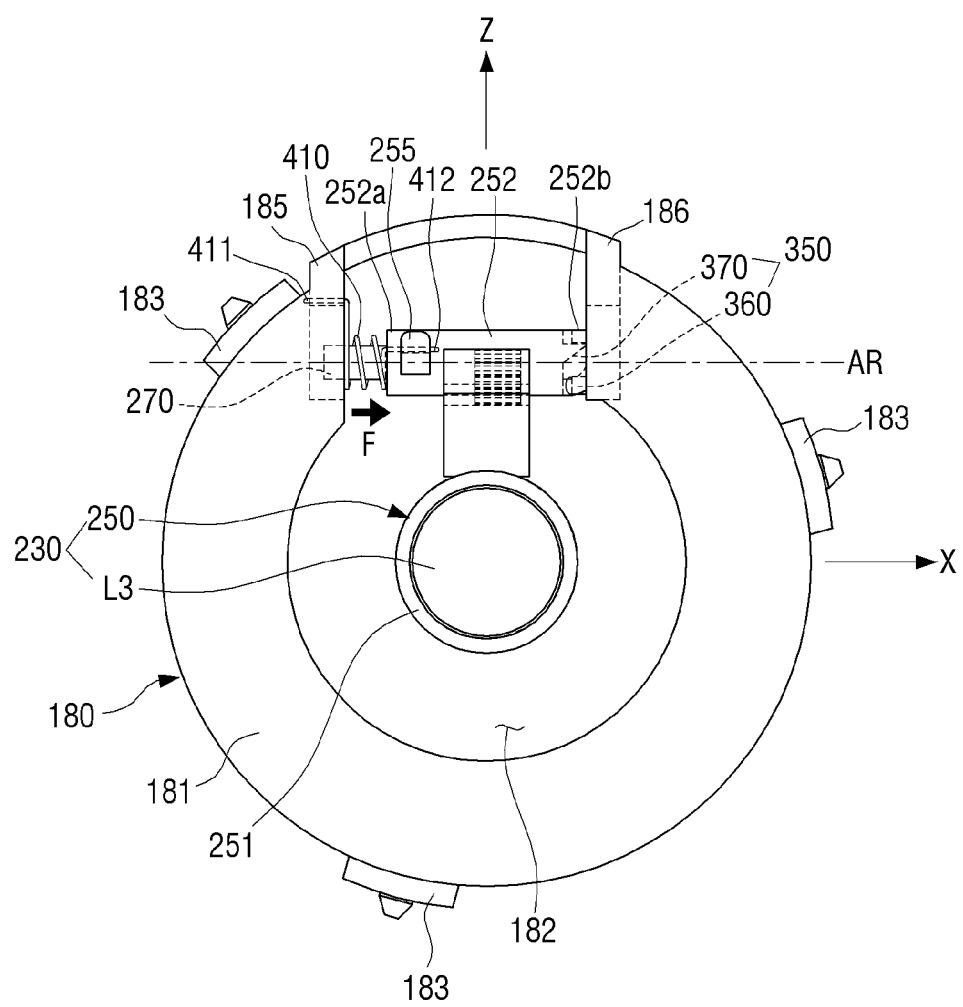
FIG. 13 is a front view illustrating a coupling state of the escape lens assembly and a third inner barrel (guide barrel)
Figure 14:
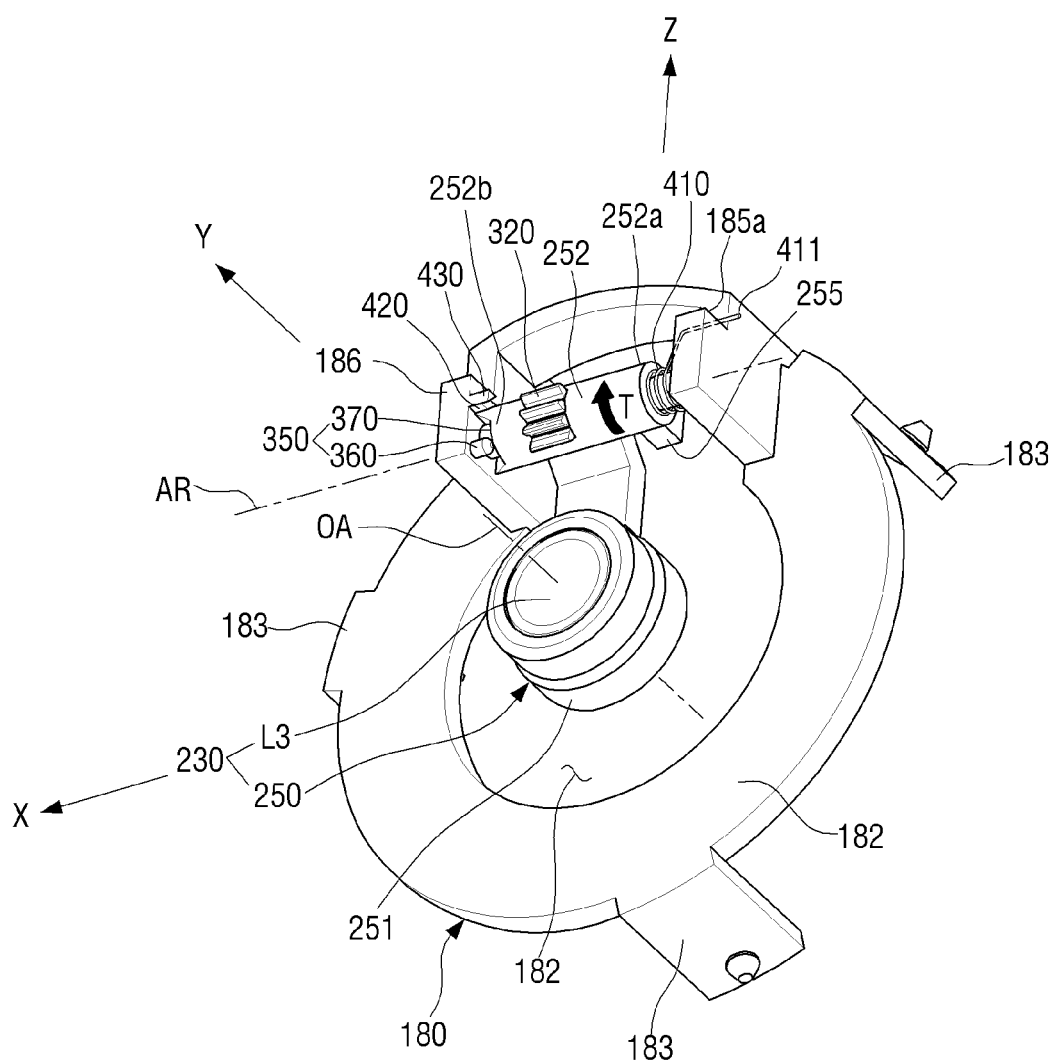
FIG. 14 is a perspective view illustrating a rear portion of the coupling state of FIG. 13.

As illustrated in FIG. 13, the return spring 410 applies a pressing force F to the escape lens assembly 230 in a +X direction along the rotating axis AR of the escape lens assembly 230. Further, as illustrated in FIG. 14, the return spring 410 applies a torque T about the rotating axis AR to the escape lens assembly 230. As described above, the return spring 410 is a compression torsion spring to apply the torque T to the escape lens assembly 230 together with the linear pressing force F. By the pressing force F and the torque T that are applied by the return spring 410, the escape lens assembly 230 can return from the non-photographing position to the photographing position to be aligned on the reference optical axis OA.

Hereinafter, referring to FIGS. 15 to 17, the escape operation of the escape lens assembly 230 by the rotating unit 310 and the slide driving unit 350 that constitute the escape unit will be described in detail.

Figure 15:
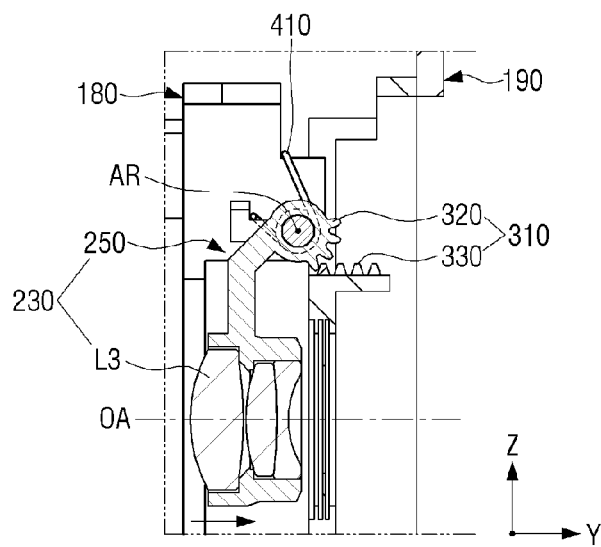
FIG. 15 is a view including a side cross-sectional view, a front view and a rear view to illustrate an escape lens assembly at a time point where an escape operation starts according to an embodiment of the present general inventive concept.
Figure 15:
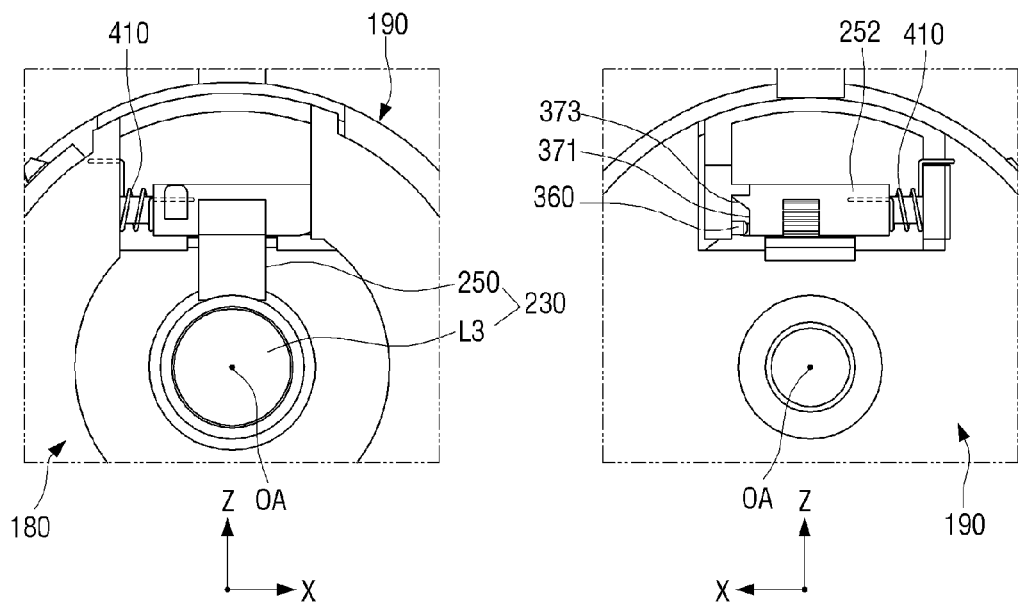
Figure 16:
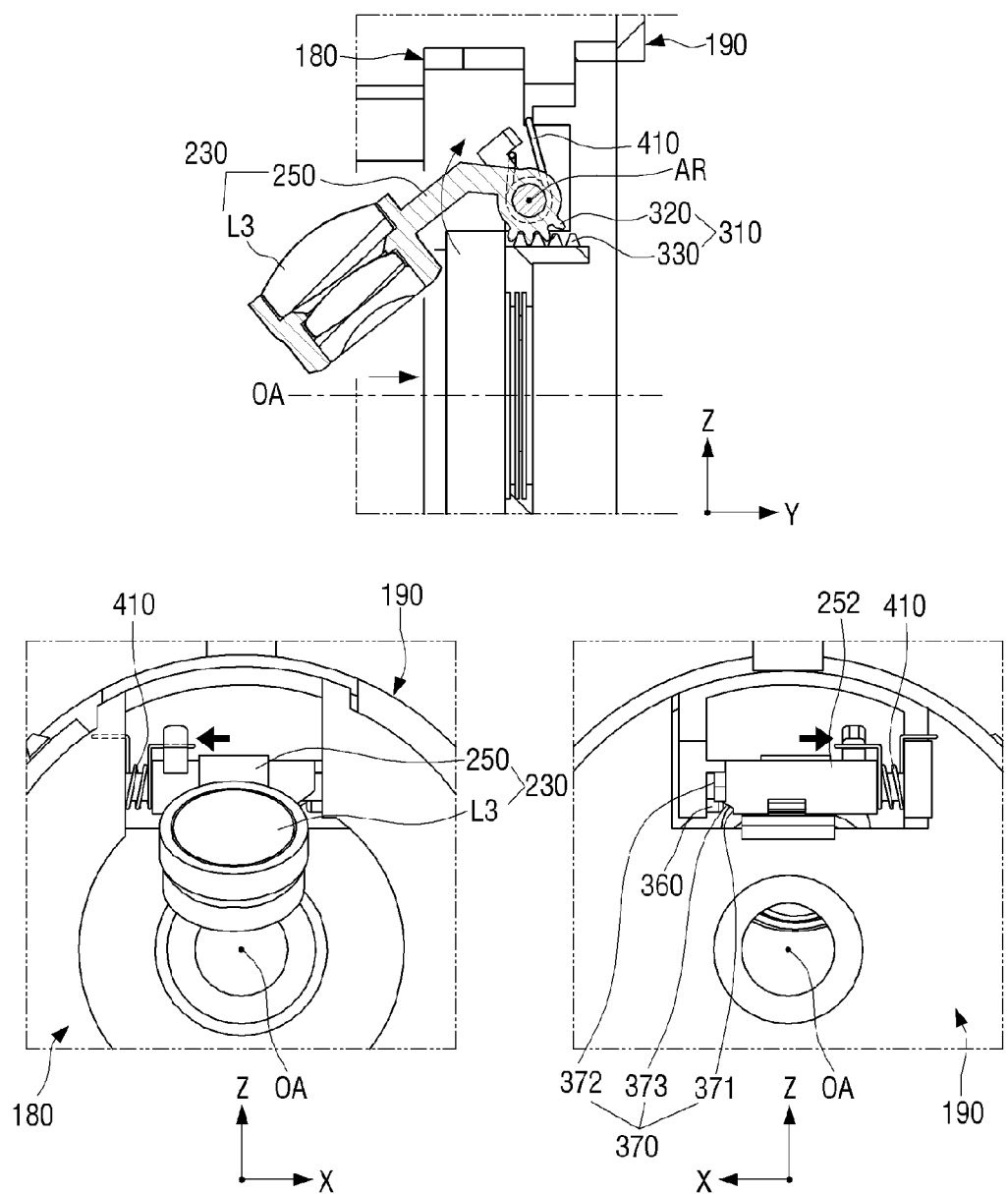
FIG. 16 is a view including a side cross-sectional view, a front view and a rear view to illustrate an escape lens assembly during an escape operation according to an embodiment of the present general inventive concept.
Figure 17:
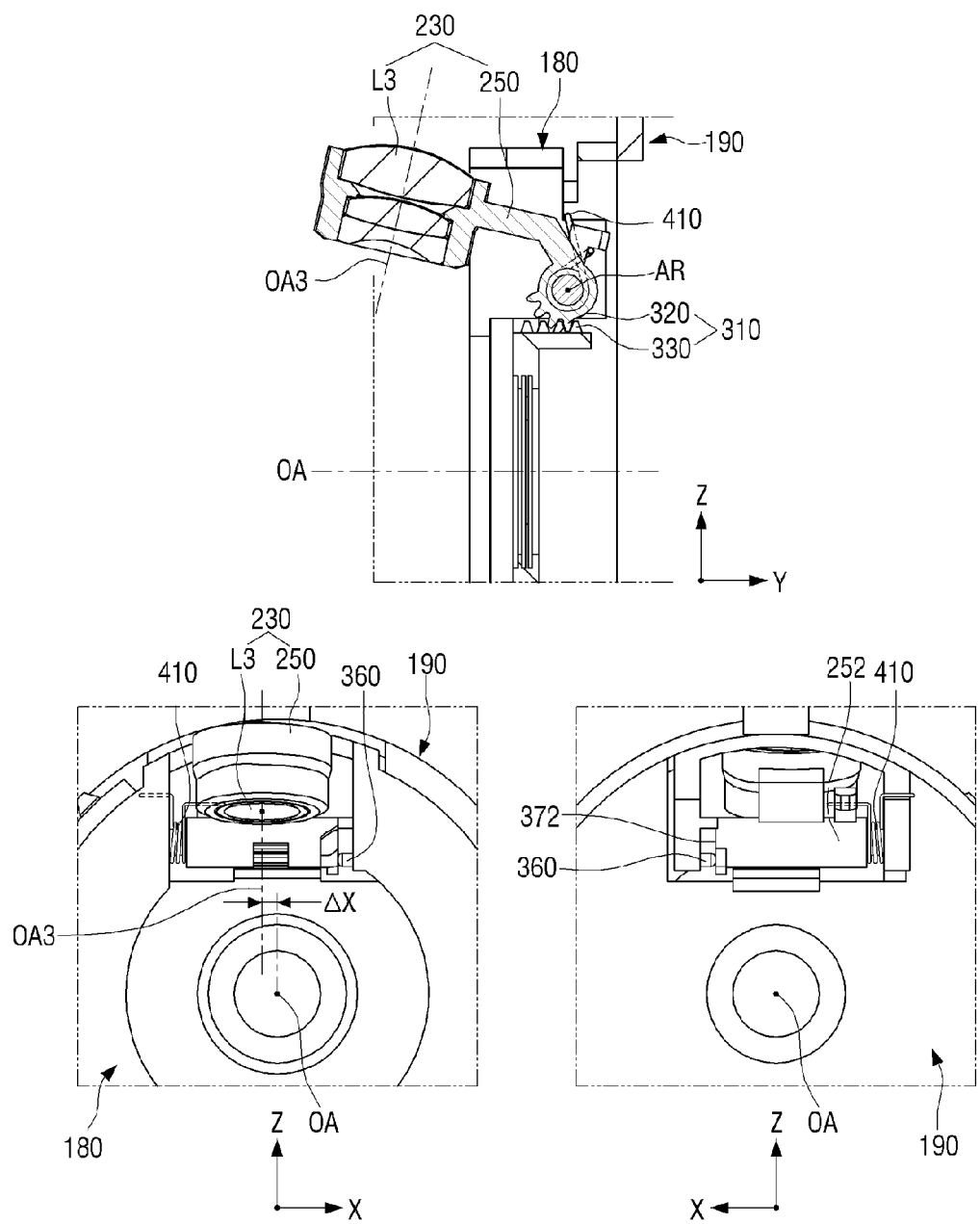
FIG. 17 is a view including a side cross-sectional view, a front view and a rear view to illustrate an escape lens assembly at a time point where an escape operation is completed according to an embodiment of the present general inventive concept.

FIG. 15 is a view illustrating the escape lens assembly 230 at a time point where the escape operation starts, FIG. 16 is a view illustrating the escape lens assembly 230 during the escape operation, and FIG. 17 is a view illustrating the escape lens assembly 230 at a time point where the escape operation is completed. In FIGS. 15, 16, and 17, an upper figure, a lower left figure, and a lower right figure correspond to a side cross-sectional view, a front view, and a rear view to illustrate a shape of the escape lens assembly 230, respectively, according to an embodiment of the present general inventive concept.

While the escape lens assembly 230 is changed from the photographing position to the non-photographing position, the escape lens assembly 230 is guided to move backward in the +Y direction along the reference optical axis OA by the guide barrel (third inner barrel) 180.

As illustrated in FIG. 15, when the escape lens assembly 230 starts moving backward to reach a position corresponding to a time point where the rotation thereof, the pinion gear 320 of the lens mount member 250 may contact the rack gear 330 formed on the shutter assembly 190. As described above, the pinion gear 320 and the rack gear 330 constitute the rotating unit 310.

At this time, the escape lens assembly 230 is kept in an aligned arrangement along the reference optical axis OA by the pressing force F (see FIG. 13) in the +X direction applied by the return spring 410 and the torque T (see FIG. 14) about the rotating axis AR thereof. At this time, the pressing protrusion 360 of the guide barrel 180 is in contact with the first contact surface 371 of the pressed surface formed on the shaft coupling portion 252 of the lens mount member 250. As described above, the pressing protrusion 360 and the pressed surface 370 constitute the slide driving unit 350.

As illustrated in FIG. 16, as the escape lens assembly 230 further goes backward by the guide barrel 180, the pinion gear 320 and the rack gear 330 are engaged with each other to rotate the pinion 320, and thus the escape lens assembly 230 rotates about the rotating axis AR thereof (in a clockwise direction as illustrated in FIG. 16).

While the escape lens assembly 230 rotates, the pressing protrusion 360 becomes in press contact with the middle surface 373 of the pressed surface 370. At this time, since the middle surface 373 is located on the outer side than the first contact surface 371 in the +X direction on the pressed surface 370, it can be understood that the escape lens assembly 230 slides in the −X direction.

After the rotation and the sliding of the escape lens assembly 230 further proceed until the going backward of the escape lens assembly 230 by the guide barrel 180 is completed, as illustrated in FIG. 17, the escape lens assembly 230 finally reaches the non-photographing position.

When the escape lens assembly 230 moves from the photographing position to the non-photographing position, its rotating angle becomes approximately 100 degrees, for example.

In the non-photographing position, the pressing protrusion 360 comes in contact with the second contact surface 372 of the pressed surface 370. As described above, the second contact surface 372 is located on the outer side than the first contact surface 371 for □X in the +X direction. Accordingly, it can be understood that in comparison to the photographing position, the escape lens assembly 230 is kept to slide for □X in the −X direction in the non-photographing position.

As described above, while the escape lens assembly 230 moves from the photographing position to the non-photographing position, the escape lens assembly 230 rotates at about 100 degrees about the rotating axis AR thereof that is parallel to the X direction, and slides by the distance ΔX in the −X direction along the rotating axis AR thereof. As a result, the optical axis OA3 of the escape lens (third group lens) L3 is in a skew position with respect to the reference optical axis OA in the non-photographing position.

Since the escape lens assembly 230 moves to escape from the reference optical axis by a combination of the rotation and the sliding when the escape lens assembly 230 moves from the photographing position to the non-photographing position, a reduction effect of a size (thickness or dimension) of the lens barrel 3 due to the escape can be increased as described above.

On the other hand, in the case where the escape lens assembly 230 moves from the non-photographing position to the photographing position, the guide barrel 180 moves forward along the reference optical axis OA, and thus the escape lens assembly 230 also moves accordingly forward. At this time, by the pressing force F (see FIG. 13) in the +X direction that is applied by the return spring 410 and the torque T (see FIG. 14) about the rotating axis AR thereof, the escape lens assembly 230 returns to the alignment position along the reference optical axis OA.

In the returning operation, the escape lens assembly 230 rotates in an opposite direction to that during the escape operation. The rotating is performed until the stop protrusion 420 (see FIG. 14) provided on the shaft coupling portion 252 of the escape lens assembly 230 meets the stopper 430 provided on the second mount portion 186 of the guide barrel 180, and at this time, the optical axis OA3 of the escape lens L3 coincides with the reference optical axis OA.

In the embodiment as described above, it is exemplified that the third group lens L3 mounted on the escape lens assembly (third lens assembly) 230 escapes from the reference optical axis OA while the mode of the lens barrel 3 is changed from the photographing mode to the non-photographing mode.

However, in other alternative embodiments, the lens barrel 3 may be designed so that the first group lens L1 or the second group lens L2, rather than the third group lens L3, escapes from the reference optical axis OA when the mode of the lens barrel 3 is changed from the photographing mode to the non-photographing mode. However, since the third group lens L3 among the first to third group lenses L1, L2, and L3 has the smallest diameter, it is possible to control the third group lens to escape from a viewpoint of the miniaturization design of the camera. For example, in a case where the second group lens L2 which has a larger diameter than the third group lens L3 escapes, the lens barrel 3 should be designed to have a higher height so that the second group lens L2 can escape, and this causes the miniaturization design of the camera to be degraded.

Further, in the embodiment as described above, it is exemplified that four lens assemblies are provided in the lens barrel 3 in total. However, the present general inventive concept is not limited thereto. It is possible that the number of lens assemblies provided in the lens barrel 3 can be changed to 5, 6, or the like.

The camera 1 of FIGS. 1 and 2 may be a digital camera, a camera usable with a network to communicate with an external device through a wired or wireless communication method, a camera usable with a computer apparatus or a mobile phone or tablet apparatus, etc.

As described above, the lens barrel 3 includes a plurality of lens assemblies to be movable along a reference optical axis during a photographing operation and/or a non-photographing operation. At least one of the plurality of lens assemblies may move in at least two directions different from the reference optical axis during a period between the photographing operation and the non-photographing operation or a period between a photographing mode and a non-photographing mode. The lens barrel 3 may include one or more driving units to drive (move) the plurality of lens assemblies, and at least one of the plurality of driving units may be used to move the at least one lens assembly in the two different directions. The two different directions include a rotating direction and a sliding direction to perform a rotating operation and a sliding operation with respect to a common axis of the at least one lens assembly.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A lens barrel usable with a camera, comprising:
a plurality of lens assemblies including an escape lens assembly to be movable along a reference optical axis of the camera; and an escape unit to control the escape lens assembly to escape from the reference optical axis when the escape lens assembly moves from a photographing position to a non-photographing position, wherein one or more lenses of the escape lens assembly have an optical axis that is in a skew position with respect to the reference optical axis in a position where the escape lens assembly has escaped; and wherein while the escape lens assembly moves from the photographing position to the non-photographing position, the escape unit rotates the escape lens assembly at a predetermined angle about a rotating axis that is perpendicular to the reference optical axis, and makes the escape lens assembly slide for a predetermined distance along a direction of the rotating axis;

wherein the escape unit comprises:
- a rotating unit to control the escape lens assembly to rotate at the predetermined angle about the rotating axis that is perpendicular to the reference optical axis while the escape lens assembly moves from the photographing position to the non-photographing position; and
- a slide driving unit to control the escape lens assembly to slide by the predetermined distance along the direction of the rotating axis.

2. The lens barrel as claimed in claim 1, wherein the escape lens assembly comprises:
- one or more escape lenses as the one or more lenses; and
- a lens mount member on which the escape lenses are mounted.

3. The lens barrel as claimed in claim 2, further comprising:
a guide barrel coupled to the lens mount member to move forward or backward along the reference optical axis.

4. The lens barrel as claimed in claim 3, wherein the rotating unit comprises:
- a pinion gear provided on the lens mount member; and
- a rack gear arranged in the rear of the escape lens assembly to be engaged with the pinion gear when the escape lens assembly moves from the photographing position to the non-photographing position.

5. The lens barrel as claimed in claim 4, wherein the rack gear is arranged along the reference optical axis.

6. The lens barrel as claimed in claim 4, further comprising:
a shutter assembly arranged in a rear portion of the escape lens assembly,
wherein the rack gear is provided on the shutter assembly.

7. The lens barrel as claimed in claim 3, wherein the slide driving unit comprises:
- a pressing protrusion extended along a direction that is parallel to the rotating axis; and
- a pressed surface formed on the lens mount member to guide sliding of the lens mount member by being pressed by the pressing protrusion while the escape lens assembly moves from the photographing position to the non-photographing position.

8. The lens barrel as claimed in claim 7, wherein the pressed surface comprises:
- a first contact surface and a second contact surface arranged vertically to the rotating axis and spaced apart from each other for the predetermined distance; and
- a middle surface to guide the pressing protrusion from any one of the first contact surface and the second contact surface, which is arranged closer to the reference optical axis, to the other contact surface arranged farther from the reference optical axis while the escape lens assembly moves from the photographing position to the non-photographing position.

9. The lens barrel as claimed in claim 7, further comprising:
a return spring to apply to the lens mount member a torque in a direction opposite to a rotating force which the rotating unit applies to the lens mount member and a force in a direction opposite to a force which the slide driving unit applies to the lens mount member.

10. The lens barrel as claimed in claim 9, further comprising:
- a stop protrusion formed on the lens mount member; and
- a stopper disposed to come in contact with the stop protrusion at a time point where the escape lens assembly returns to the reference optical axis.

11. The lens barrel as claimed in claim 10, wherein the lens mount member comprises:
- a lens mount portion on which the escape lens is mounted;
- a shaft coupling portion coupled to the guide barrel through a shaft member; and
- a connection portion to connect the lens mount portion to the shaft coupling portion.

12. The lens barrel as claimed in claim 11, wherein the pinion gear is formed on an outer periphery of the shaft coupling portion.

13. The lens barrel as claimed in claim 11, wherein the guide barrel comprises:
- a barrel main body; and
- first and second mount portions to which both ends of the shaft member are coupled.

14. The lens barrel as claimed in claim 13, wherein:
- the return spring is arranged to press a first end portion of the shaft coupling portion that is adjacent to the first mount portion; and
- the pressed surface is formed on a second end portion of the shaft coupling portion that is adjacent to the second mount portion.

15. The lens barrel as claimed in claim 14, wherein a first end portion of the return spring is fixed to the first mount portion, and a second end portion of the return spring is fixed to the shaft coupling portion.

16. The lens barrel as claimed in claim 14, wherein the pressing protrusion projects from an inner side surface of the second mount portion.

17. The lens barrel as claimed in claim 14, wherein:
- the stop protrusion is formed at the second end portion of the shaft coupling portion; and
- the stopper is formed on the inner side surface of the second mount portion.

18. A digital camera including a camera main body and a lens barrel which projects out of a main body of a camera during photographing and is disposed in the main body of the camera during non-photographing, wherein the lens barrel comprises:
- a plurality of lens assemblies including an escape lens assembly to be movable along a reference optical axis of the camera; and
- an escape unit to control the escape lens assembly to escape from the reference optical axis when the escape lens assembly moves from a photographing position to a non-photographing position, wherein one or more lenses of the escape lens assembly have an optical axis that is in a skew position with respect to the reference optical axis in a position where the escape lens assembly has escaped; and wherein while the escape lens assembly moves from the photographing position to the non-photographing position, the escape unit rotates the escape lens assembly at a predetermined angle about a rotating axis that is perpendicular to the reference optical axis, and makes the escape lens assembly slide for a predetermined distance along a direction of the rotating axis,
wherein the escape unit comprises:
a rotating unit to control the escape lens assembly to rotate at the predetermined angle about the rotating axis that is perpendicular to the reference optical axis while the escape lens assembly moves from the photographing position to the non-photographing position; and
a slide driving unit to control the escape lens assembly to slide by the predetermined distance along the direction of the rotating axis.

* * * * *